(12) United States Patent
Harris

(10) Patent No.: US 6,655,648 B2
(45) Date of Patent: Dec. 2, 2003

(54) OUTDOOR MECHANICAL EQUIPMENT MOUNTING SYSTEM

(76) Inventor: Stuart W. Harris, 1670 N. Gerrard Ave., Speedway, IN (US) 46224

( * ) Notice: Subject to any disclaimer, the term of this patent is extended or adjusted under 35 U.S.C. 154(b) by 0 days.

(21) Appl. No.: 09/749,157

(22) Filed: Dec. 27, 2000

(65) Prior Publication Data

US 2002/0079421 A1 Jun. 27, 2002

(51) Int. Cl.$^7$ ................................................. F16M 9/00
(52) U.S. Cl. ............. 248/678; 248/346.01; 248/346.04; 248/638; 248/156; 248/52; 248/167.1; 248/292; 248/220; 248/475
(58) Field of Search ................................. 248/545, 633, 248/678, 679, 680, 156, 346.01, 506, 508, 85, 615, 688, 638, 346.03, 346.04; 52/167.1, 156, 157, 166, 292; 220/475

(56) References Cited

U.S. PATENT DOCUMENTS

| | | | | |
|---|---|---|---|---|
| 3,311,333 A | * | 3/1967 | Galloway | 248/44 |
| 3,722,845 A | * | 3/1973 | Unger | 248/346 |
| 4,212,446 A | * | 7/1980 | Domanick et al. | 248/678 |
| 4,714,225 A | * | 12/1987 | Skinner et al. | 248/523 |
| 4,793,111 A | * | 12/1988 | Shewchuk | 52/298 |
| 5,586,742 A | * | 12/1996 | Carter | 248/545 |
| 5,863,165 A | * | 1/1999 | Schulte | 411/386 |
| 5,873,679 A | * | 2/1999 | Cusimano | 405/231 |
| 5,961,093 A | * | 10/1999 | Jones et al. | 248/678 |

* cited by examiner

*Primary Examiner*—Kimberly Wood
(74) *Attorney, Agent, or Firm*—Woodward, Emhardt, Moriarty, McNett & Henry LLP

(57) ABSTRACT

An air conditioning or heat pump condenser assembly has a base mounted on a molded plastic pad. The pad is mounted on four, auger-type stabilizer rods screwed into the ground. Nuts threaded onto upper ends of the rods in recesses in the top of the pad, fix the pad to the rods. The condenser assembly base is positioned on the pad to cover the nuts on the stabilizer rods to make the nuts inaccessible once the condenser base is in place on the pad. Vibration isolators are disposed between the pad and the base. A portion of the pad, usually centrally located thereon, is provided with extra thickness to receive security screws installed from above through the base of the condenser assembly and into the pad. The security screws are a thread cutting type enabling installation by the installer at a plurality of possible locations above the security area, some or all of which may be obscured enough by equipment on the condenser base to obscure and delay or prevent removal thereof by a thief. Alarm provisions are also made.

11 Claims, 6 Drawing Sheets

US 6,655,648 B2

OUTDOOR MECHANICAL EQUIPMENT MOUNTING SYSTEM

BACKGROUND OF THE INVENTION

1. Field of the Invention

This invention relates generally to outdoor installations of mechanical equipment, and more particularly to a system for convenient, stable, inexpensive installations and inhibiting theft of such equipment.

2. Description of the Prior Art

For many years, outdoor condensing units and heat pumps were set on level and durable "pads" of poured concrete. Then pre-formed concrete pads were used. In recent years, there has been increasing use of pre-fabricated plastic pads which have been improved from time-to-time. They are placed directly on the ground at level construction sites, or on arrangements of chemically treated wood timbers where the site is sloping. With the passage of time and, depending on the soil at the location of the pad, settling may occur. Where settling does occur, often it is irregular, resulting in the condenser or heat pump assuming an awkward tilted position. In addition to the unsightly appearance, the settling often increases exposure of the unit to damage of the refrigerant lines and to the unit as a whole, by lawn care machines or other factors.

Another problem of a different nature which has become common in some areas, is theft of the condenser or heat pump unit. An air conditioning condenser unit usually comprises a base pan which is simply placed on the pad. The compressor and related condenser heat exchanger are permanently mounted to the base pan. The cover or housing is removably mounted to the base pan by several bolts readily accessible from the outside. In order to steal such a system, thieves need only to cut the electrical supply cables and the two refrigerant lines, lift the condenser onto a truck and drive away. In some areas, particularly in some new housing developments, theft of such units from a number of houses under construction, can occur during one night. One way to inhibit theft is to go back to the use of a poured concrete pad with threaded studs projecting vertically from the top of the pad. Then the base of the condenser assembly to be used has to be drilled in a pattern matching the stud pattern in the pad. Then the condenser assembly is placed over the stud array and lowered onto the pad, and then nuts are installed on the studs.

My invention addresses the foregoing settling, instability and security problems, with less installation time and labor.

SUMMARY OF THE INVENTION

Described briefly, according to the illustrated embodiment of the present invention, a mounting pad of a strong material relatively immune to climatic conditions and much lighter in weight than concrete and most woods, is mounted on a plurality of stakes secured in the earth at the installation site. The stakes have fasteners thereon to fix the pad to the stakes and in a level attitude, regardless of ground contour. An air conditioning or heat pump condenser assembly, having a base portion, is positioned to cover the fasteners on the stakes to make the fasteners inaccessible once the condenser base is in place on the pad. Vibration isolators are disposed between the pad and the base. A portion of the pad, usually centrally located thereon, is provided with extra density to receive security screws installed from above by driving through the base of the condenser assembly and into the pad. The security screws are a thread cutting type so as to enable installation by the installer at a plurality of possible locations above the security area, some or all of which may be obscured enough by equipment on the condenser base to delay or prevent removal thereof by a thief. Alarm provisions are also made.

DESCRIPTION OF THE ILLUSTRATED EMBODIMENT

Figure 1:
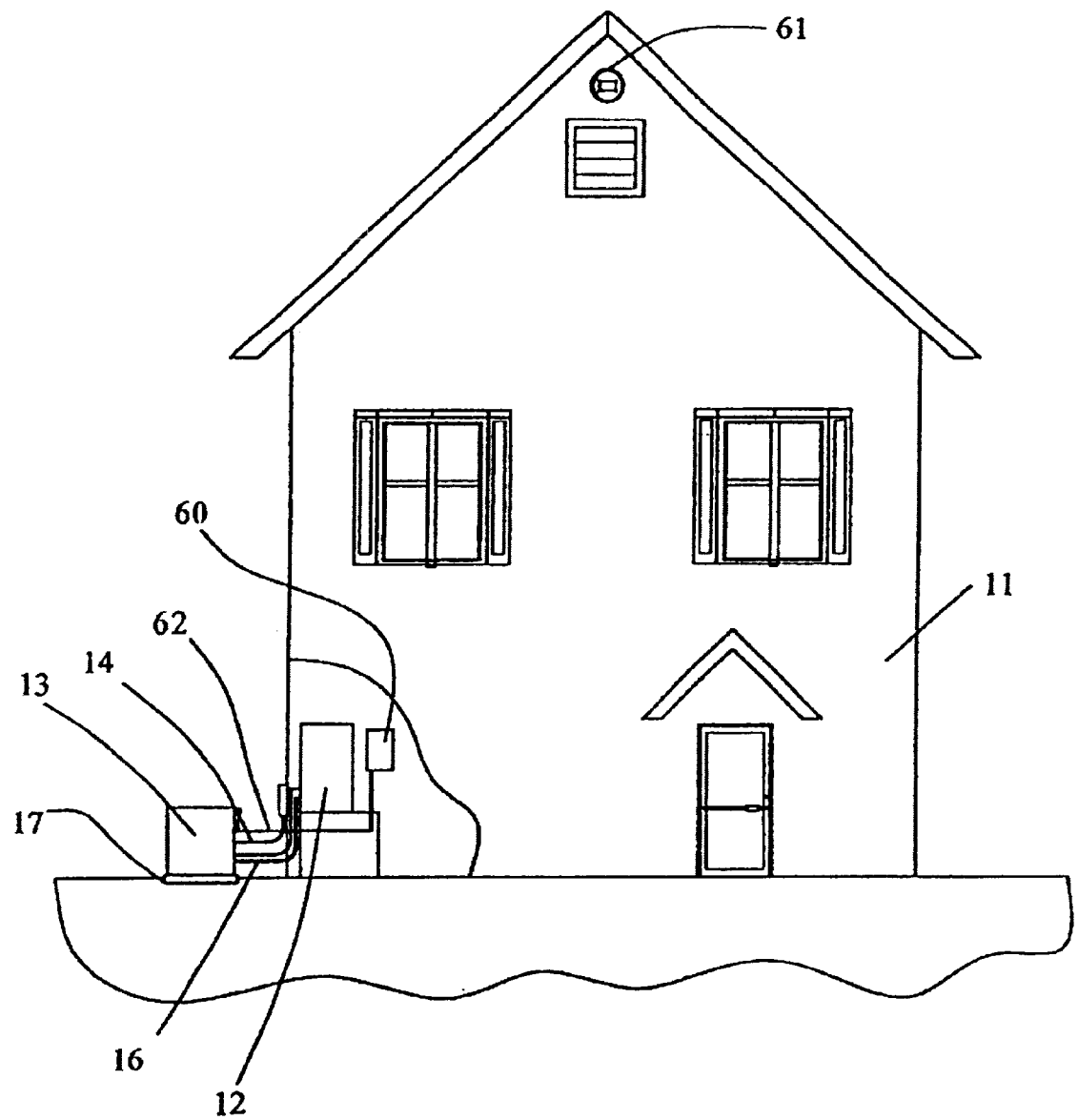
FIG. 1 is a sketch of a typical environment in which the present invention is employed.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 shows a house 11 and a cut-away portion of an outside wall showing equipment 12 which may be an evaporator coil and air handling unit of a furnace or heat pump. A condenser assembly 13 is mounted outside the house, typically on either a poured concrete pad or a pre-fabricated plastic pad of some nature. The condenser assembly is connected to the air handler and evaporator coil by electrical cabling 14 and refrigerant tubing 16. Because many new residential developments simply place a plastic pad on the ground and place the condenser assembly on the pad, it is only necessary for thieves to cut the electrical and refrigerant connections to free the condenser assembly and pad for removal of the condenser assembly, with or without the pad, from the site.

Figure 2:
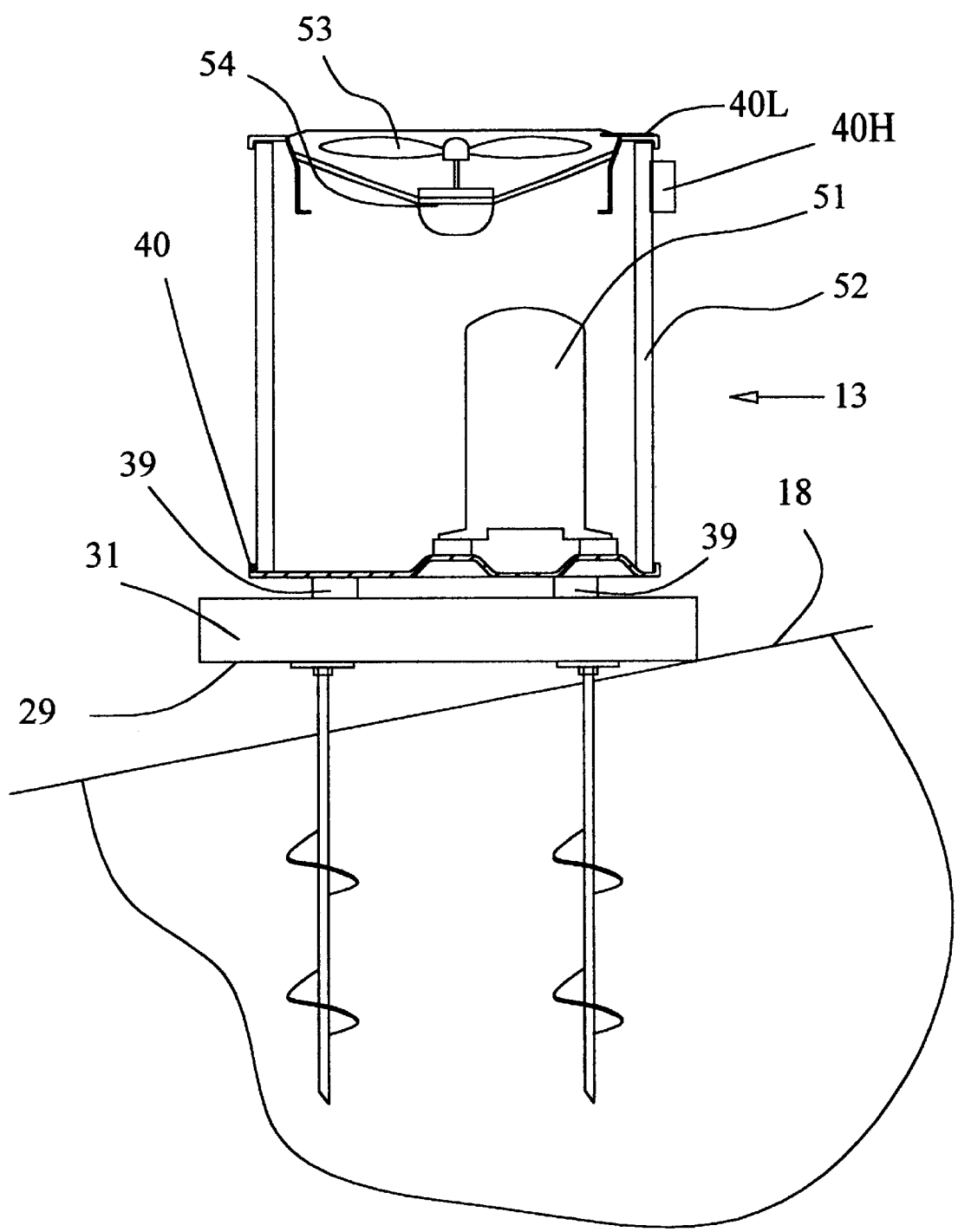
FIG. 2 is an enlarged view of a refrigerant condenser assembly mounted on a sloping site and employing the mounting system according to a typical embodiment of the present invention.

Referring now to FIG. 2, and since the condenser assembly stabilizing and security system according to the present invention can be readily used on either a level site such as 17 in FIG. 1 or a sloping site such as 18 in FIG. 2, the components and method of use will now be described and be recognized as well adapted and effective for either type of site.

Figure 3:
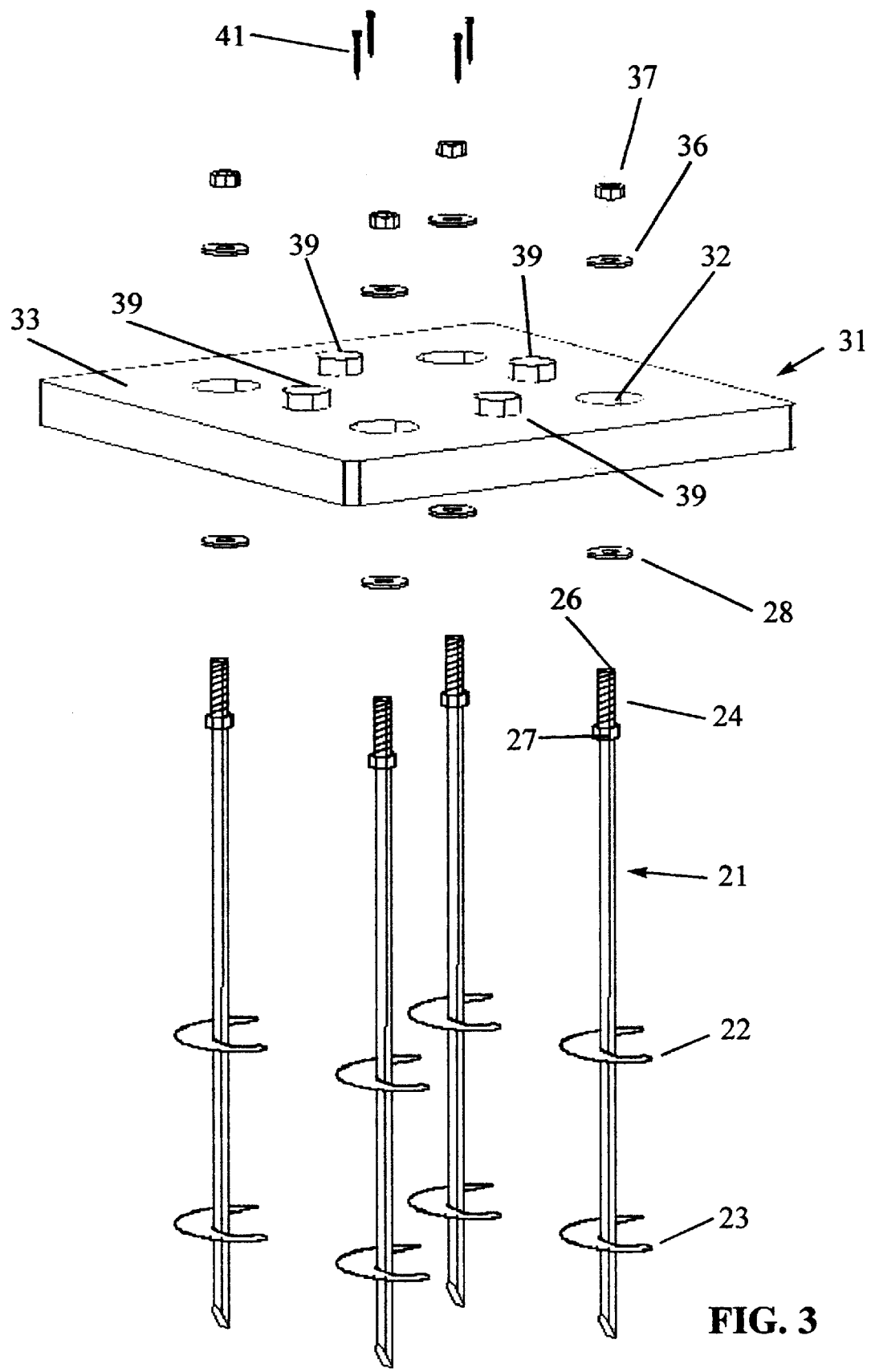
FIG. 3 is an exploded view of the installation kit components according to one embodiment of the present invention.

For most installations, a kit of components generally shown in FIG. 3 can be used. It includes four stake-like members, described herein as support and stabilizer bars 21, each of which, in the illustrated example, is a three-quarter inch diameter black iron bar, three feet long with two vertically spaced helix auger blades 22 and 23. The bar is threaded at 24 for two inches down from the upper end 26 of the bar. A standard hexagonal nut 27 is welded to the bar at the base of the threads. The location of the nut from the top of the bar is adapted to a one and one-eighth inch deep well socket to be received around the nut and rest on the bar end, to facilitate screwing the bar into the ground by the use of a regular socket wrench set handle.

Figure 5:
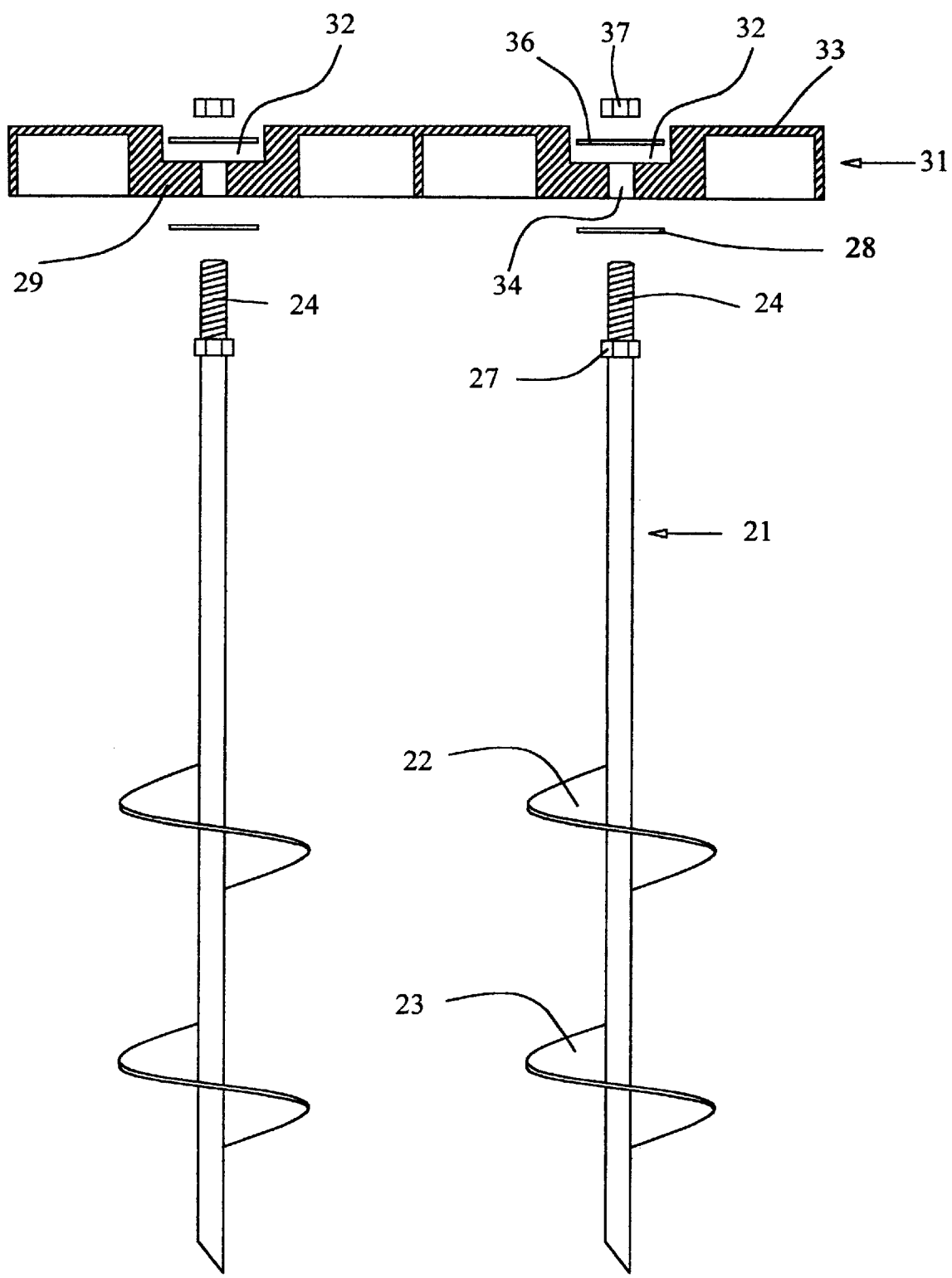
FIG. 5 is an exploded view of the components of the kit arranged in the manner in which they are assembled, this view taken at line 5—5 in FIG. 4 and viewed in the direction of the arrows.
Figure 6:
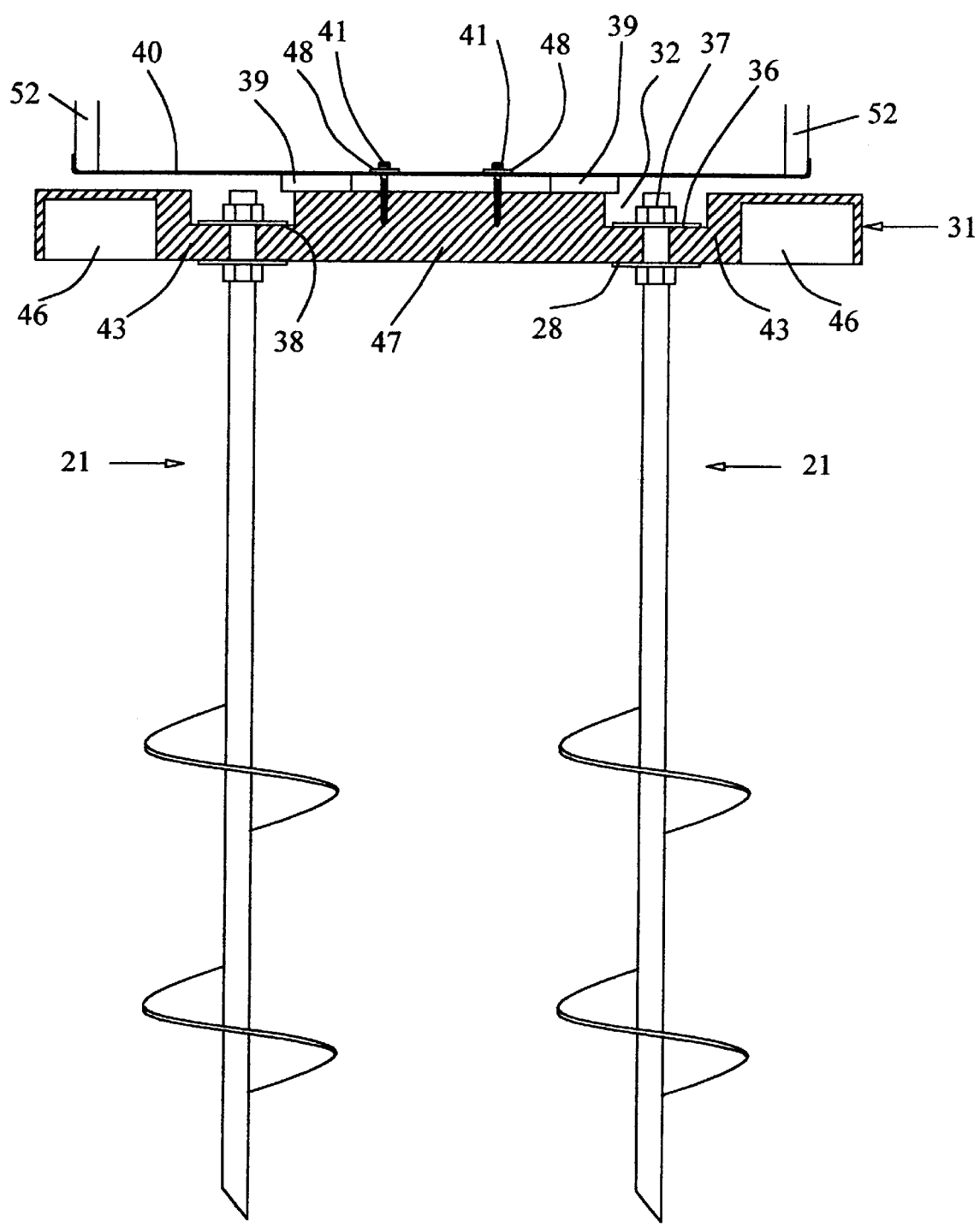
FIG. 6 is a view similar to FIG. 5 but showing the assembly fixed in place according to the illustrated embodiment and with an air conditioning condenser assembly (shown fragmentarily) secured to it, according to the present invention.

A flat washer 28 is provided for each of the bars to rest atop nut 27 and engage and support the bottom face 29 of the pad 31. This pad has four recesses or cups 32 formed in the top surface and which are typically three inches in diameter and one and one-half inches deep from the top surface 33 of the pad. Since the pad is three inches deep from top 33 to bottom 29, the threaded portion of the support and stabilizer bars 21 extends upward through a hole 34 in the pad (FIG. 5). Round, flat washers 36 and nuts 37 are provided for reception on the threaded portion of the bar which extends up into cup 32 when the pad is installed on the bars and supported by washers 28, as shown in FIG. 6. Upon tightening the nut 37 on the bar, the pad is well anchored between washer 28 engaging the bottom surface 29 and the washer 36 engaging the bottom 38 of the cup 32 in the pad.

Referring further to FIG. 3, four vibration isolators 39 are shown resting on top of the pad 31. These are typically circular discs of dense black rubber one-half inch high and two inches in diameter. They may be placed in any suitable position determined by the installer, depending upon the size and nature and arrangement of components on the base of the condenser assembly.

Finally, referring again to FIG. 3, there are four "system security" screws 41. As an example, each of these is a three-eighths inch diameter, self-tapping, course thread screw, two inches long with a head having a hexagonal socket therein.

Figure 4:
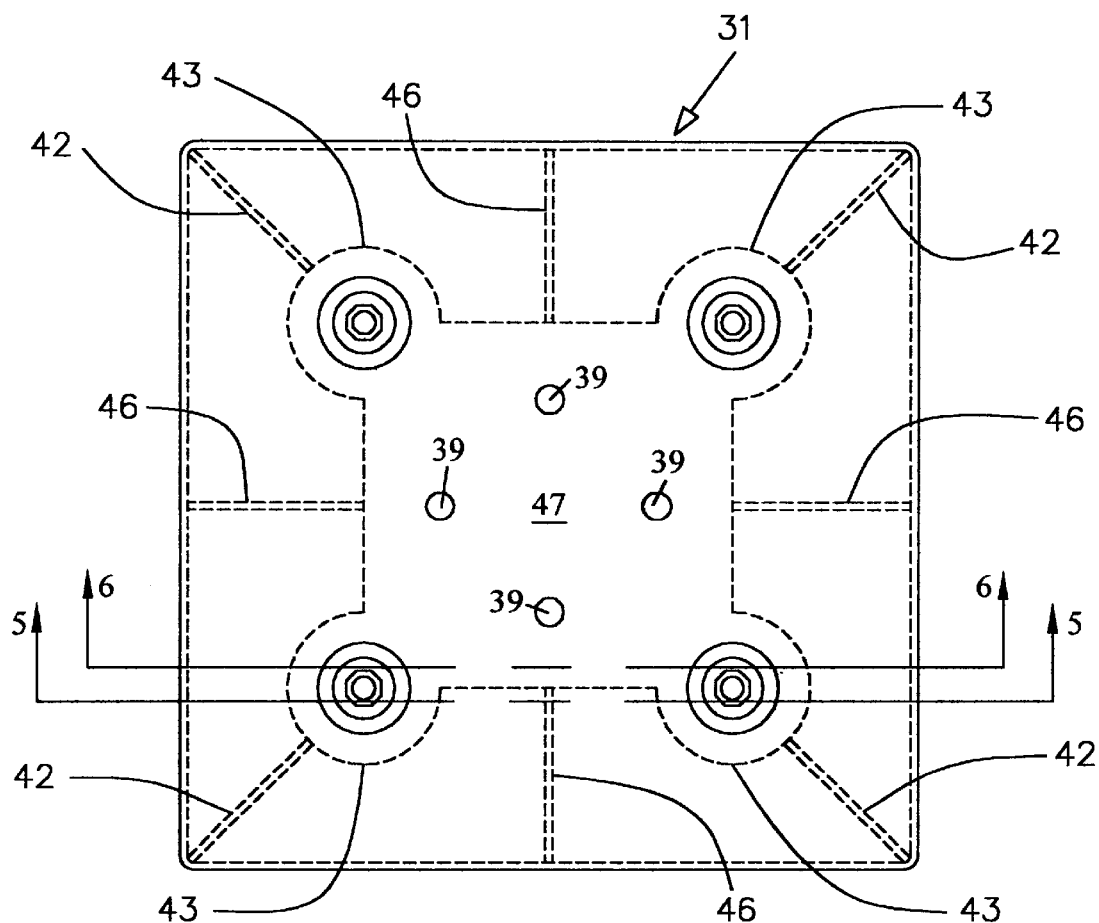
FIG. 4 is a top plan view of the mounting pad employed in the kit as installed at a site, but before mounting the condenser assembly to it.

Referring now to FIG. 4, the pad 31 is shown from the top as it would appear to the installer after the installer has mounted it on the four posts and secured it in place with the nuts 37 installed on the rods 21. FIG. 5 shows the pieces in order for assembly in order starting from bottom up, and ready for installation. FIG. 6 shows them as installed, with the addition of the condenser base 40 supported on vibration isolators 39 and installed on the pad.

Referring back to FIG. 4, the dashed lines represent an example of a configuration of the pad underside usable with the present invention. As indicated in FIGS. 4, 5 and 6, the pad, which is typically a molded plastic product, does not have a full thickness of plastic throughout its entire area. Instead, it is somewhat a shell, with full thickness reinforcing ribs or webs 42 from the outer, full thickness walls of the shell at the corners to the full thickness hub portions 43 in which the cups 32 and bolt receiving apertures 34 are formed. There are additional webs 46 from the outer walls to the security anchor area 47 centered in the pad and which is a full thickness area of the pad extending out to the hubs 43.

The house 11 can have an alarm system including, for example, a control panel 60, an alarm light and an annuciator 61 such as a siren or horn and an electrical connection 62 between the condenser housing 13 and the control panel. The electrical connection 62 can be one of several of the type normally employed in alarm systems and which, when disturbed, will cause the annunciator 61 to activate. The electrical connection 62 can be connected to the condenser assembly 13 at 40H for example, or to the electrical or refrigerant connections to the condenser assembly. Also, a label 40L (FIG. 2) can be placed on the housing to alert a would-be thief, or an equipment service person, that the equipment is secured by an alarm system.

INSTALLATION

The installation site is studied with consideration to the type of soil and the slope or grade, if any. A pad is selected with the appropriate shape and size for the air conditioning condenser or heat pump assembly to be placed on it. Then, depending upon the spacing and arrangement of the support bar cups in the pad, matching locations can be marked on the ground using an appropriate template corresponding to the pad. The stabilizers are started into the ground at selected locations with a hammer. Then, the one and one-eighth inch deep well socket is installed over the top of each rod, engaged with the nut welded to the rod. With a ratchet wrench or socket operating handle installed in the socket, each stabilizer rod can be screwed into the ground. If the installation site is level, the stabilizer may be screwed into the ground until the nut 27 reaches the ground surface. If the site is not level, the stabilizers at the low side of the site will not be screwed in as far as those at the high side. All stabilizers should be installed precisely vertical and parallel to each other and to a depth so that the tops of all of the nuts 27 are in a level plane. Then the washers 28 are installed on rods 21, followed by the pad. Then the washers 36 are installed on the threaded portion of the rods 21 sticking up into the cup 32. This is followed by the nuts 37 screwed onto the rods and tightened.

Once the pad has been secured on the stabilizer rods, the isolators 39 are placed on the pad at a location best suited to support the condenser assembly base 40. Condenser bases vary with manufacturer, so the installer should place the isolators 39 wherever seems most appropriate. Then the self-tapping screws 41, preferably with lock washers 48 (FIG. 6) under the heads, should be screwed through the base, from the interior region of the equipment, adjacent the rubber isolators and into the dense central area 47 of the pad. The threaded shank of each fastener goes into the platform and the head of each fastener is only accessible from the interior region. The specific location thereof will be determined by the installer and preferably situated so they would be obscure to a thief if aware of their presence, in attempting to access them for theft of the condenser. Various equipment items in the condenser assembly will be located differently depending upon the manufacturer. One simple example shown in FIG. 2 is the compressor 51, condenser 52, and fan 53 driven by motor 54.

The foregoing description provides some specific dimensions and shapes of the components. These are only examples of an embodiment of the invention which will work with much of the residential air conditioning or heat pump systems currently in use in the market. For larger residential, commercial or industrial equipment, variations in dimensions, shapes and sizes can be employed. Similarly, while high density polyethylene may be one of the suitable materials for pad construction, other materials and densities may be found to be preferable, depending upon the load bearing requirements and environmental conditions at the installation site.

The use of my invention will provide a variety of benefits. It provides a kit of components which can be easily used with conventional tools in various level or sloping installation sites. The components, individually, are relatively light in weight, convenient in size, easily transportable, and adapted to quick installation. They provide a stable and adequate support for a condenser or heat pump assembly. They enable the installer to conveniently and securely anchor the condenser assembly to the pad and select the most convenient and optimum location for the security screws to minimize the likelihood of a thief finding or readily removing them. The condenser assembly is secure without the necessity of pouring a concrete pad on a level site or, worse yet, at a sloping site, and avoids the necessity for providing the studs in the pad before it sets and locating them so that they will not interfere with components on the compressor base. It avoids the necessity for drilling the compressor base to match the stud pattern and for lining up the compressor base with the studs to get it installed on the pad. Consequently, home builders can have an installation that is good and dependable for years. Householders, likewise, will have a better looking and longer lasting secure installation.

In addition to the foregoing, the invention is useful for mounting swimming pool equipment such as pumps, filter systems, heat exchangers and anything to be secured to the ground, at a level or sloping site.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. Mounting and stabilization apparatus for outdoor mechanical equipment and comprising:
   a plurality of ground anchors, each of said ground anchors being vertically oriented, parallel rods with helical auger blades and a tool receiver in fixed location thereon and oriented for reception of a tool facilitating rotation about the rod axis to screw the ground anchor into the ground;
   a platform supported on said anchors so that predetermined surfaces on the platform are level, each of said parallel rods having a threaded upper end portion received through a corresponding aperture in said platform into a corresponding cup in the top of said platform;
   anchor fasteners securing said platform on said ground anchors, said anchor fasteners being nuts threaded onto said parallel rods above the bottoms of said cups and securing said platform to said ground anchors;
   an equipment base;
   security fasteners securing said base to said platform, each security fastener having a head and threaded shank and being constructed and arranged to be inserted through said base from an interior region of said equipment and threaded into said platform, such that said security fastener heads are only accessible from said interior region; and
   washers resting atop said tool receivers and engaging the bottom of said platform and supporting said platform on said parallel rods.

2. Mounting and stabilization apparatus for outdoor mechanical equipment and comprising:
   a plurality of ground anchors;
   a platform supported on said anchors so that predetermined surfaces on the platform are level;
   anchor fasteners securing said platform on said anchors;
   an equipment base;
   security fasteners securing said base to said platform and wherein:
      said platform comprises a shell portion and a central portion of one homogeneous body of molded material, the shell portion being of a predetermined height, and the central portion being of substantially the same height but solid molded material throughout substantially the entire area of the central portion, said platform having anchor fastener receiver cups therein;
      said base is constructed and arranged to cover said cups and any anchor fasteners therein;
      said security fasteners are screwed through the base into the central portion to anchor the base to the central portion;
      said security fasteners are self-tapping threaded screws with the shanks thereof extending through the base and into at least one and three-eights inches into the central portion of said base whereby said security screws are permanently and securely anchored in said central portion of said platform;
      the material of said platform is high density polyethylene molded in one piece to form said platform; and
      the apparatus further comprises:
         refrigeration equipment including a refrigerant condenser mounted on said base; and
         vibration isolators mounted on top of said platform and supporting said equipment base.

3. Mounting and stabilization apparatus for outdoor mechanical equipment and comprising:
   a plurality of ground anchors;
   a platform supported on said anchors so that predetermined surfaces on the platform are level;
   anchor fasteners securing said platform on said anchors;
   an equipment base;
   security fasteners securing said base to said platform;
   refrigeration equipment including a refrigerant condenser mounted on said base; and
   vibration isolators mounted on top of said platform and supporting said equipment base.

4. The mounting and stabilization apparatus of claim 3 said anchors are vertically oriented, parallel rods with helical auger blades and a tool receiver in fixed location thereon and oriented for reception of a tool facilitating rotation about the rod axis to screw the anchor into the ground.

5. The mounting and stabilization apparatus of claim 4 and wherein:
   said rods have threaded upper end portions received through apertures in said platform into cups in the top of said platform; and
   said anchor fasteners are nuts threaded onto said rods above the bottoms of said cups and securing said platform to said anchors.

6. The mounting and stabilization apparatus of claim 5 and further comprising:
   washers resting atop said tool receivers and engaging the bottom of said platform and supporting said platform on said rods.

7. The mounting and stabilization apparatus of claim 3 and wherein:
   said platform comprises a shell portion and a central portion of one homogeneous body of molded material, the shell portion being of a predetermined height, and the central portion being of substantially the same height but solid molded material throughout substantially the entire area of the central portion, said platform having anchor fastener receiving cups therein.

8. The mounting and stabilization apparatus of claim 7 and wherein:

said base is constructed and arranged to cover said cups and any anchor fasteners therein; and said security fasteners are screwed through the base into the central portion to anchor the base to the central portion.

9. The mounting and stabilization apparatus of claim 8 and wherein:

said security fasteners are self-tapping threaded screws with the shanks thereof extending through the base and into at least one and three-eighths inches into the central portion of said base whereby said security screws are permanently and securely anchored in said central portion of said platform.

10. The mounting and stabilization apparatus of claim 9 and wherein:

the material of said platform is high density polyethylene molded in one piece to form said platform.

11. Mounting and stabilization apparatus for outdoor mechanical equipment and comprising:

a plurality of ground anchors;

a platform supported on said anchors so that predetermined surfaces on the platform are level;

anchor fasteners securing said platform on said anchors;

an equipment base;

security fasteners securing said base to said platform; and vibration isolators mounted on top of said platform and supporting said equipment base.

* * * * *